INVENTORS
WILHELM ALBRECHT
JOSEF EIBL

ATTORNEYS

United States Patent Office 3,570,326
Patented Mar. 16, 1971

3,570,326
SAFETY STEERING DEVICE FOR
MOTOR VEHICLES
Wilhelm Albrecht, Vaihingen, and Josef Eibl, Waiblingen,
Germany, assignors to Daimler-Benz Aktiengesellschaft, Stuttgart-Unterturkheim, Germany
Filed Jan. 17, 1969, Ser. No. 791,894
Claims priority, application Germany, Jan. 20, 1968,
P 16 80 011.6
Int. Cl. B26d 1/00
U.S. Cl. 74—552
34 Claims

ABSTRACT OF THE DISCLOSURE

A safety steering for motor vehicles in which a deformation member is arranged between the steering wheel and the head piece of the steering spindle which includes only a single section plastically deformable under impact effect that passes over within the area of its largest diameter into a substantially non-deformable, inherently rigid section.

---

Figure 1:
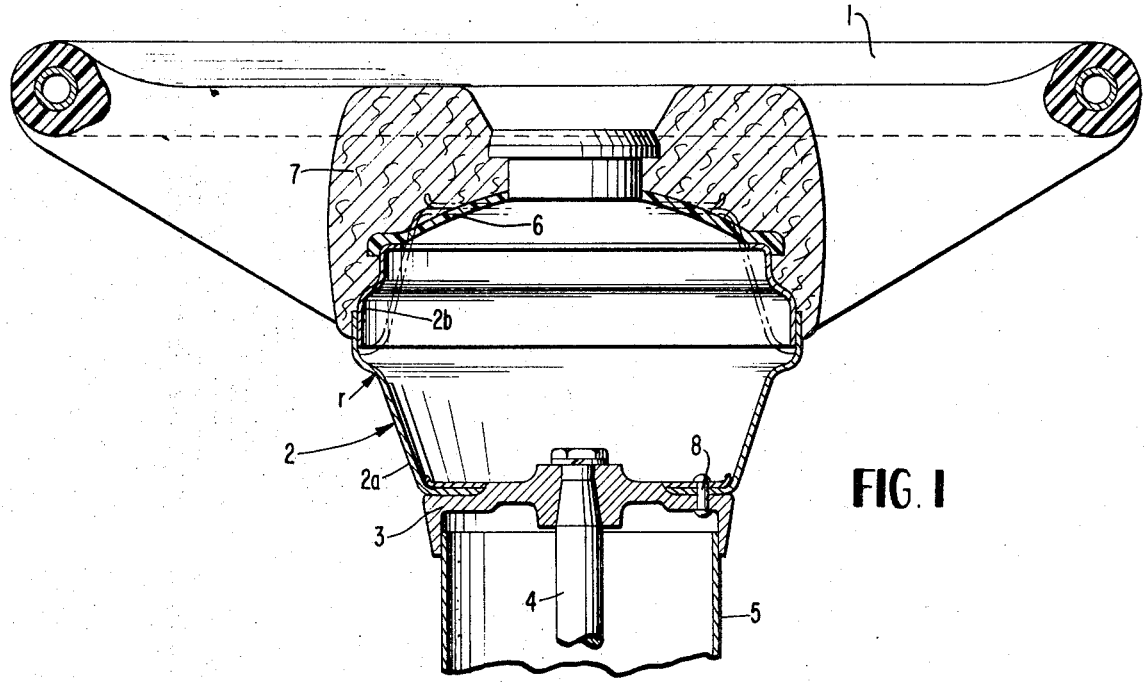

The present invention relates to a safety steering device for motor vehicles in which a deformation member consisting of sheet metal is arranged between the steering wheel and the steering spindle or the outer column of the steering which in case of impact of the driver on the steering wheel caused by accidents converts at least a part of the impact energy into deformation work and thus contributes to the protection of the driver.

Deformation members, which are also referred to as impact pots, are known already in the prior art whose diameter decreases in a step-shaped manner from the steering wheel to the steering spindle or outer steering column. Exhaustive tests have, however, demonstrated that during the compression of such types of impact pots, force peaks corresponding to the number of steps occur because the compression does not take place concentrically but instead takes please non-uniformly and under the formation of polygonal bucklings or bendings.

For the maintenance of the concentricity of the individual steps of such types of impact pots during the compression it has therefore already been proposed also to construct the effective wall thickness of mutually successive sections alternately stronger and weaker. It is achieved by such a construction of the impact pot that during the compression, a thin-walled section is folded into the form-stable section disposed thereabove, so to speak. However, it is disadvantageous with such deformation members that the manufacture thereof is made significantly more costly by the different wall thicknesses of the individual section.

In a further proposed type of construction of a deformtion member which, however, does not form part of the prior art, a smooth walled, cylindrical or conical impact pot is provided, which with corresponding load is folded over the outer column of the steering. However, with the present, far-reachingly customary steering-wheel shifting-mechanism such an impact pot runs up against the parts of the shifting mechanism during the compression whereby again undesired force peaks result.

The present invention therefore aims at avoiding the disadvantages of the aforementioned impact pots and at creating a deformation member which with as constant as possible a force is uniformly deformable and which performs as large as possible a deformation work with a predetermined deformation path.

Consequently, a safety steering system for motor vehicles with a deformation member consisting of sheet metal and arranged between the steering wheel and the head piece of the steering spindle or outer steering column whose diameter decreases from the steering wheel toward the steering spindle or toward the outer column, is proposed, whereby according to the present invention the deformation member is provided with only one soft section plastically deformable under impact influence and conical in longitudinal cross section which within the area of its largest diameter passes-over with a diameter enlargement into a section which is nondeformable.

The form-stable or inherently rigid section may thereby advantageously enclose a hollow space in the steering wheel hub.

The height of the form-stable section should advantageously correspond approximately to the height of the deformable section or a part of its height may be filled by a padding of the steering wheel hub consisting, for example, of conventional foam material.

According to a preferred type of construction of the present invention the diameter enlargement from the end of the deformable section opposite the steering wheel to the form-stable section corresponds approximately to thirty times the sheet metal thickness of the first-mentioned section.

The transition from the deformable to the form-stable section of the deformation member may be constructed as a bend, and more particularly preferably as a radius which corresponds approximately to fifteen times the sheet metal thickness of the first-mentioned section.

The securing of the deformation member at the steering spindle takes place preferably by way of a hub whose diameter corresponds at least to the diameter of the outer column of the steering.

The diameter of the deformation member should thereby correspond at its end facing the hub at least to the diameter of this hub.

The connection of the deformation member with the hub takes place thereby preferably by a riveted connection.

However, it may also be advantageous if the deformation member is secured at the outer column of the steering and the steering wheel is rotatable with respect to the deformation member.

Accordingly, it is an object of the present invention to provide a safety steering for motor vehicles which avoids by simple means the aforementioned shortcomings and drawbacks encountered in the prior art.

Another object of the present invention resides in a safety steering for motor vehicles which is relatively inexpensive in manufacture and which is devoid of force peaks.

A further object of the present invention resides in a safety steering for motor vehicles which is uniformly deformable with as constant as possible a force and which produces as large as possible a deformation work with a predetermined deformation path.

Figure 2:
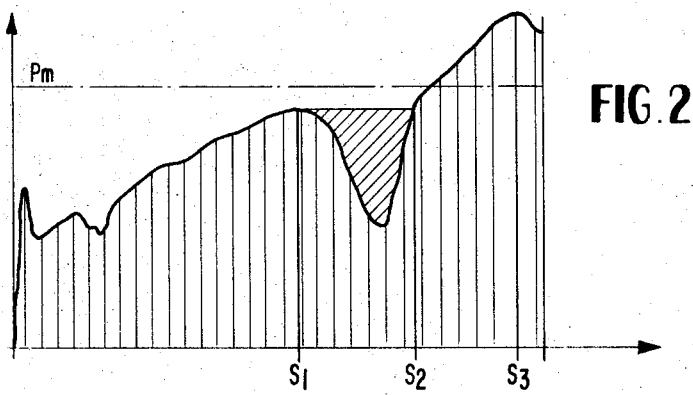
Figure 3:
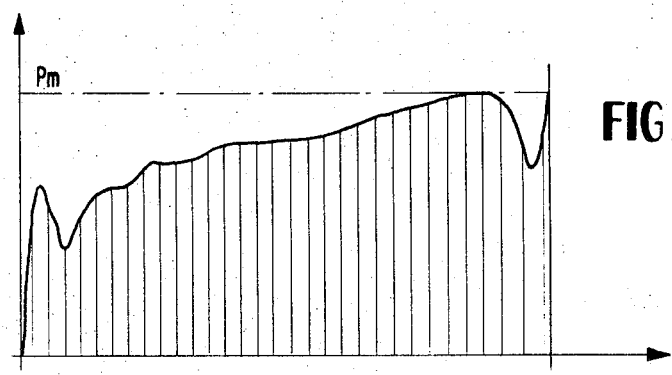
Figure 4:
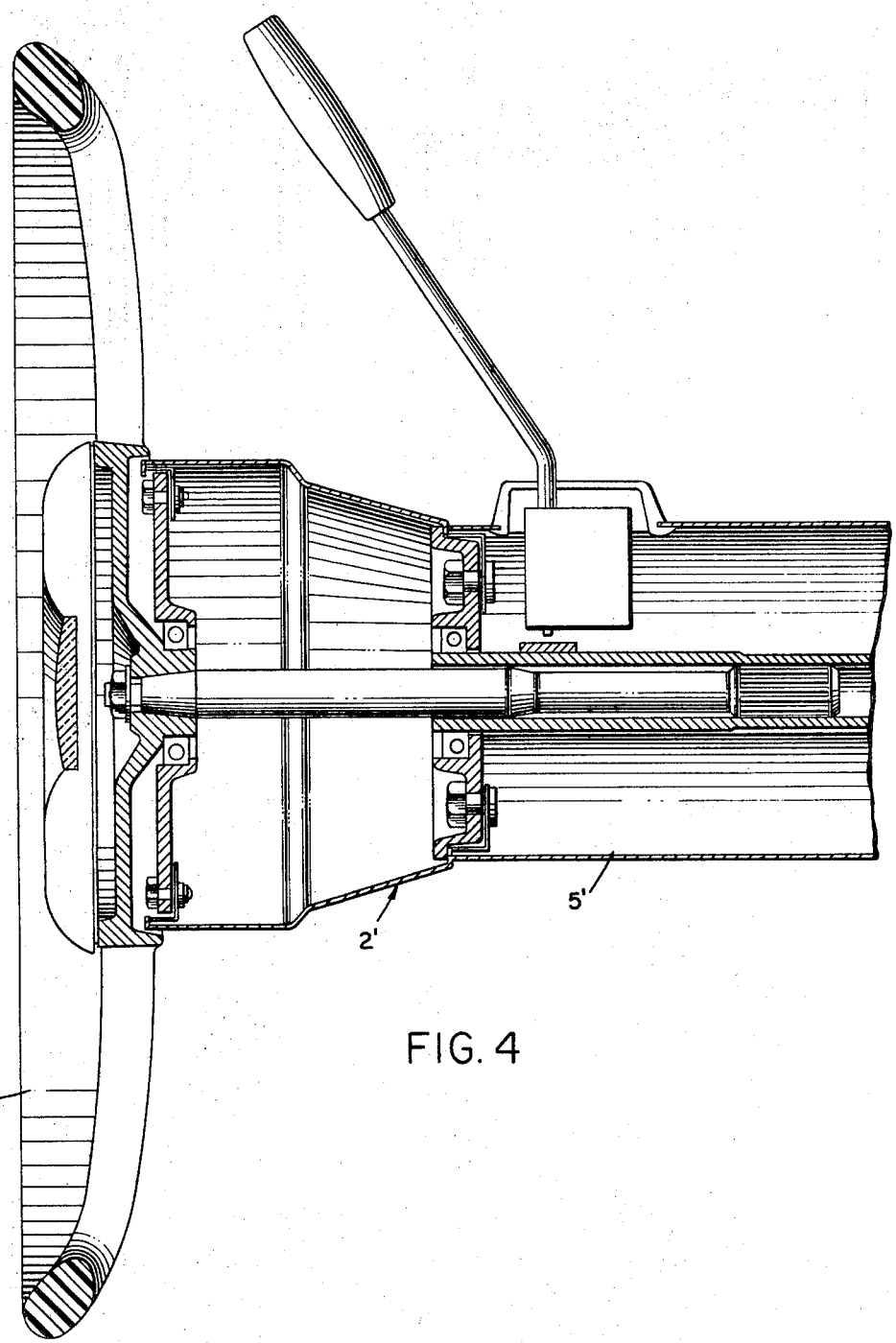

These and further objects, features and advantages of the present invention will become more obvious from the following description when taken in connection with the accompanying drawing which shows, for purposes of illustration only, one embodiment in accordance with the present invention, and wherein FIG. 1 is an axial, longitudinal cross-sectional view through a safety steering device in accordance with the present invention, FIGS. 2 and 3 are diagrams illustrating schematically the deformation work of a prior art, multi-step deformation member and of a deformation member with only a single deformable section in accordance with the present invention, respectively; and FIG. 4 is an axial, longitudinal cross-sectional view through a modified embodiment of the safety steering device in accordance with the present invention.

Referring now to the drawing, and more particularly to FIG. 1, the steering wheel 1 of the safety steering illustrated in this figure is connected under interposition of a deformation member generally designated by reference numeral 2, which includes a soft, plastically deformable section 2a and a rigid, form-stable section 2b, with the steering spindle 4 by way of a hub 3. The diameter of the hub 3 is thereby slightly larger than the diameter of the outer column 5 of the steering. The inherently stable section 2b of the deformation member 2 is delimited in the upward direction by a cover 6 consisting preferably of conventional synthetic resinous material of a padding 7 of the steering hub, whereby preferably a foamed material of any conventional type is used as padding material. The cover 6 and the padding 7 are thereby to be so constructed that during the folding or inverting of the deformable section 2a of the deformation member 2 into the rigid section 2b (illustrated in the drawing in dash lines) they are able to deflect without thereby causing an essential force increase.

The transition from the conical section 2a of the deformation member 2 to the section 2b is constructed as a radius r, wherby r corresponds approximately to fifteen times the sheet metal thickness of the deformable section 2a.

The connection of the deformation member 2 with the hub 3 secured on the steering spindle 4 takes place by a riveted connection 8.

The diagrams represented in FIGS. 2 and 3 illustrate the operation of a known deformation member with two two deformable sections and of a deformation member according to the present invention with only a single plastically deformable section, respectively.

In both diagrams the force measured during the compression is plotted against the deformation path.

The force diagram illustrated in FIG. 2 from the deformation path zero to the deformation path $S_1$ corresponds to a concentric deforming of two deformable sections of a tested impact pot. Starting from the place $S_1$, there begins a diagonal buckling which at first entails a strong force decrease and thereupon at the deformation path $S_3$, leads to a force maximum.

An impact pot with only a single deformable step with the same wall thickness and the same overall deformation path was used for the test according to FIG. 3. The force diagram is thereby considerably more uniform and the force maximum $P_m$ lies considerably lower than with the two-step impact pot which formed the basis of the test according to FIG. 2.

If one therefore presupposes that both deformation members are to produce approximately the same deformation work with predetermined deformation path, then the force peak with the impact pot having two deformable sections is considerably higher than with the impact pot having only a single deformable section and the range of $S_1$ to $S_2$ in FIG. 2 is not fully utilized for the deformation work because within the area indicated by the inclined cross-hatching, no deformation work is carried out as a result of the force decrease during buckling.

FIG. 4 shows a deformation member 2' which is secured at the outer column 5' and the steering wheel 1', and the steering wheel is rotatable with respect to the deformation member.

While we have shown and described only one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are within the scope of those skilled in the art.

We claim:

1. A safety steering for motor vehicles in which a deformation member is arranged between the steering wheel and the head piece of the steering spindle of the steering which consists of sheet metal and whose diameter decreases from the steering wheel toward the steering spindle, characterized in that the deformation member includes only one relatively soft, first section plastically deformable under impact effect which, within the area of its largest diameter, passes over with a diameter enlargement into a relatively non-deformable second section.

2. A safety steering according to claim 1, wherein said plastically deformable first section is substantially conical in longitudinal cross section.

3. A safety steering according to claim 2, wherein the second section encloses substantially a hollow space in the steering wheel hub.

4. A safety steering according to claim 3, wherein the height of the relatively non-deformable second section corresponds at least approximately to the height of the deformable first section.

5. A safety steering according to claim 4, wherein a part of the height of the second section is filled by a padding of the steering wheel hub.

6. A safety steering according to claim 5, wherein said padding consists of foam material.

7. A safety steering according to claim 5, wherein the diameter increase from the end of the first section opposite the steering wheel to the second section of the deformation member corresponds to approximately thirty times the sheet metal thickness of the first section.

8. A safety steering according to claim 7, wherein the transition from one to the other section of the deformation member is of curved configuration.

9. A safety steering according to claim 8, wherein the transition is constructed as radius whose length corresponds to approximately fifteen times the sheet metal thickness of the deformable first section.

10. A safety steering according to claim 9, wherein the deformation member is secured at the steering spindle by way of hub means whose diameter corresponds at least to the diameter of the outer column.

11. A safety steering according to claim 10, wherein the diameter of the deformation member at the end facing said hub means corresponds at least to the diameter of said hub means.

12. A safety steering according to claim 11, wherein the connection of the deformation member with the hub means takes place by a riveted connection.

13. A safety steering according to claim 1, wherein the second section encloses substantially a hollow space in the steering wheel hub.

14. A safety steering according to claim 1, wherein the height of the relatively non-deformable second section corresponds at least approximately to the height of the deformable first section.

15. A safety steering according to claim 13, wherein a part of the height of the second section is filled by a padding of the steering wheel hub.

16. A safety steering according to claim 15, wherein said padding consists of foam material.

17. A safety steering according to claim 1, wherein the diameter increase from the end of the first section opposite the steering wheel to the second section of the deformation member corresponds to approximately thirty times the sheet metal thickness of the first section.

18. A safety steering according to claim 17, wherein the transition from one to the other section of the deformation member is of curved configuration.

19. A safety steering according to claim 1, wherein the transition from one to the other section of the deformation member is of curved configuration.

20. A safety steering according to claim 19, wherein the transition is constructed as a radius whose length corresponds to approximately fifteen times the sheet metal thickness of the deformable first section.

21. A safety steering according to claim 1, wherein the deformation member is secured at the steering spindle by way of hub means whose diameter corresponds at least to the diameter of the outer column.

22. A safety steering according to claim 21, wherein the diameter of the deformation member at the end facing said hub means corresponds at least to the diameter of said hub means.

23. A safety steering according to claim 1, wherein the connection of the deformation member with the tub takes place by a riveted connection.

24. A safety steering for motor vehicles in which a deformation member is arranged between the steering wheel and the outer column of the steering which consists of sheet metal and whose diameter decreases from the steering wheel toward the outer column, characterized in that the deformation member includes only one relatively soft, first section plastically deformable under impact effect which, within the area of its largest diameter, passes over with a diameter enlargement into a relatively non-deformable second section.

25. A safety steering according to claim 24, wherein said plastically deformable first section is substantially conical in longitudinal cross section.

26. A safety steering according to claim 25, wherein the second section encloses substantially a hollow space in the steering wheel hub.

27. A safety steering according to claim 26, wherein the height of the relatively non-deformable second section corresponds at least approximately to the height of the deformable first section.

28. A safety steering according to claim 27, wherein a part of the height of the second section is filled by a padding of the steering wheel hub.

29. A safety steering according to claim 28, wherein the diameter increase from the end of the first section opposite the steering wheel to the second section of the deformation member corresponds to approximately thirty times the sheet metal thickness of the first section.

30. A safety steering according to claim 29, wherein the transition from one to the other section of the deformation member is of curved configuration.

31. A safety steering according to claim 30, wherein the tarnsition is constructed as radius whose length corresponds to approximately fifteen times the sheet metal thickness of the deformable first section.

32. A safety steering according to claim 31, wherein the deformation member is secured at the steering spindle by way of hub means whose diameter corresponds at least to the diameter of the outer column.

33. A safety steering according to claim 32, wherein the diameter of the deformation member at the end facing said hub means corresponds at least to the diameter of said hub means.

34. A safety steering according to claim 33, wherein the steering wheel is rotatable with respect to the deformation member.

References Cited
UNITED STATES PATENTS

| | | | |
|---|---|---|---|
| 3,167,974 | 2/1965 | Wilfert | 74—492X |
| 3,285,091 | 11/1966 | Fiala | 74—552 |
| 3,396,599 | 8/1968 | Altmann | 74—492 |
| 3,434,367 | 3/1969 | Renneker et al. | 74—492 |

FRED C. MATTERN, Jr., Primary Examiner
F. D. SHOEMAKER, Assistant Examiner